(12) United States Patent
Hida et al.

(10) Patent No.: US 11,255,989 B2
(45) Date of Patent: Feb. 22, 2022

(54) BUILDING INTEGRITY ASSESSMENT SYSTEM

(71) Applicant: Yokogawa Electric Corporation, Tokyo (JP)

(72) Inventors: Takenori Hida, Tokyo (JP); Kouichi Sato, Tokyo (JP); Takashi Yoshida, Tokyo (JP); Yasushi Higashino, Tokyo (JP); Tetsuya Shimosaka, Nagano (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/806,411

(22) Filed: Mar. 2, 2020

(65) Prior Publication Data

US 2020/0284930 A1 Sep. 10, 2020

(30) Foreign Application Priority Data

Mar. 4, 2019 (JP) .............................. JP2019-038134

(51) Int. Cl.
*G01V 1/00* (2006.01)
*G08B 21/10* (2006.01)
(Continued)

(52) U.S. Cl.
CPC ............. *G01V 1/008* (2013.01); *G08B 21/10* (2013.01); *G01M 5/0033* (2013.01);
(Continued)

(58) Field of Classification Search
CPC .. G01V 1/008; G01V 1/18; G01V 2210/1232; G08B 21/10; G01M 5/0033; G01M 5/0066
(Continued)

(56) References Cited

U.S. PATENT DOCUMENTS

2003/0198415 A1\* 10/2003 Miyagawa ............ F16C 27/066
  384/450
2014/0368341 A1\* 12/2014 Williams ............... G08B 21/10
  340/540

(Continued)

FOREIGN PATENT DOCUMENTS

JP    2001-338381 A    12/2001
JP    2008-249345 A    10/2008
(Continued)

OTHER PUBLICATIONS

English translation for JP 2013254239. Dec. 2019. (Year: 2019).\*
(Continued)

*Primary Examiner* — Michael P Nghiem
(74) *Attorney, Agent, or Firm* — Osha Bergman Watanabe & Burton LLP (57) ABSTRACT

A building integrity assessment system includes: an earthquake detector including: a building bottom sensor at a bottom of a building and that detects acceleration and an earthquake early-warning receiver that receives an earthquake early warning; a cloud computer; and sensors disposed at a plurality of positions in the building and that measures an influence of an earthquake on the building at each of the positions and wirelessly transmits measurement results to the cloud computer. The cloud computer estimates and evaluates the integrity of the building based on the measurement results. In response to the building bottom sensor detecting preliminary tremors or the earthquake early-warning receiver receiving the earthquake early warning, the plurality of sensors measures the influence of the earthquake on the building from a time before a major motion arrives at the building to a time after the arrival.

8 Claims, 5 Drawing Sheets

(51) Int. Cl.
*G01M 5/00* (2006.01)
*G01V 1/18* (2006.01)

(52) U.S. Cl.
CPC ............. *G01M 5/0066* (2013.01); *G01V 1/18* (2013.01); *G01V 2210/1232* (2013.01)

(58) Field of Classification Search
USPC .......................................................... 702/15
See application file for complete search history.

(56) References Cited

U.S. PATENT DOCUMENTS

| | | | |
|---|---|---|---|
| 2015/0276954 A1 | 10/2015 | Yokoyama et al. | |
| 2015/0355050 A1* | 12/2015 | Yoshida | G01M 5/0066 702/56 |
| 2017/0363486 A1* | 12/2017 | Okulov | G01L 1/005 |
| 2019/0242147 A1* | 8/2019 | Richardson | E04H 6/12 |
| 2020/0003918 A1* | 1/2020 | Vancho | G08B 21/10 |
| 2020/0116021 A1* | 4/2020 | Mancini | G01N 33/383 |
| 2020/0166017 A1* | 5/2020 | Hansen | F03D 7/0276 |

FOREIGN PATENT DOCUMENTS

| | | |
|---|---|---|
| JP | 2013-254239 A | 12/2013 |
| JP | 2015-004526 A | 1/2015 |
| JP | 2015-201189 A | 11/2015 |
| JP | 2016-075583 A | 5/2016 |
| JP | 2017-167883 A | 9/2017 |

OTHER PUBLICATIONS

English Abstract of IN201631033752 (Year: 2016).*
Wada, Kiyoshi et. al.; "System Identification"; Corona Publishing Co., Ltd; Mar. 21, 2017; with partial translation; See p. 108 Section 3.3, p. 124 Section 3.4, p. 131 Section 3.5 (29 pages).

* cited by examiner

| NO. | PROPERTY PLACE | MAXIMUM EARTHQUAKE RECORD IN PERIOD | |
|---|---|---|---|
| | | RECORDING DATE & TIME | STATE |
| 1 | 1ST FL. | AT __:__ ON __-__-__ | DANGEROUS |
| 2 | 2ND FL. | | |
| 3 | 3RD FL. | AT __:__ ON __-__-__ | SAFE |
| 4 | 4TH FL. | | |
| 5 | 5TH FL. | AT __:__ ON __-__-__ | SAFE |
| 6 | 6TH FL. | AT __:__ ON __-__-__ | |
| 7 | 7TH FL. | AT __:__ ON __-__-__ | |
| 8 | SOUTH-EAST PILLER ON 1ST FL. | AT __:__ ON __-__-__ | INSPECTION REQUIRED |
| 9 | SOUTH-WEST PILLER ON 1ST FL. | AT __:__ ON __-__-__ | INSPECTION REQUIRED |
| 10 | NORTH-EAST PILLER ON 1ST FL. | | |
| 11 | NORTH-WEST PILLER ON 1ST FL. | AT __:__ ON __-__-__ | INSPECTION REQUIRED |
| 12 | SOUTH-EAST PILLER ON 2ND FL. | AT __:__ ON __-__-__ | INSPECTION REQUIRED |
| 13 | SOUTH-WEST PILLER ON 2ND FL. | | |

BUILDING INTEGRITY ASSESSMENT SYSTEM

CROSS-REFERENCE TO RELATED APPLICATIONS

This application claims priority to Japanese Patent Application No. 2019-038134, filed on Mar. 4, 2019, the content of which is incorporated herein by reference in its entirety.

BACKGROUND OF THE INVENTION

Field of the Invention

The present invention relates to a building integrity assessment system that diagnoses and evaluates the integrity of a building based on measurement results of sensors installed in the building.

Description of Related Art

There are various kinds of structural health monitoring system that enable the integrity of a building such as a degree of damage to the building and the like to be ascertained without directly observing the building after the outbreak of earthquakes.

For example, Japanese Unexamined Patent Application, First Publication No. 2013-254239 (hereinafter, referred to as Patent Document 1) discloses a configuration with a plurality of accelerometers installed on a plurality of floors of a building, a recording unit that computes and analyzes seismic intensities on each floor and evaluates damage to the building based on detection data from the plurality of accelerometers inside the building and records the analysis results, and a notification means that gives a notification of the analysis results transmitted from the recording unit.

In the configuration disclosed in Patent Document 1, the plurality of accelerometers, the recording unit, and the like need to be set to operate at all times. For this reason, a storage battery is required for causing the accelerometers, the recording unit, and the like to operate, which makes a size of the system configuration large.

In addition, Japanese Unexamined Patent Application, First Publication No. 2015-4526 (hereinafter, referred to as Patent Document 2), for example, discloses a configuration in which seismic sensors are installed in joining parts of a plurality of structural members forming a structural frame of a structure, and the presence of damage and a degree of damage to the structural members are detected based on a relation between an input and output of dynamic characteristics in which detection information of a seismic sensor, which is installed in another joining part at which an end of one of the structural members on the side opposite to one end thereof joined at the joining part, is set to the input and the seismic sensors of one joining part are set to the output.

Also in the configuration disclosed in Patent Document 2, a storage battery is required for causing the plurality of seismic sensors and a recording device that records detection information of the seismic sensors to operate at all times, which makes a size of the system configuration large.

In addition, Japanese Unexamined Patent Application, First Publication No. 2016-75583 (hereinafter, referred to as Patent Document 3) discloses a configuration in which a sensor that is disposed on an observation level of a building and detects a seismic intensity of an earthquake and an acceleration of vibration applied to the building from the ground due to the earthquake, and an integrity assessment unit that obtains a necessary shearing force coefficient corresponding to the building's natural period based on response information from the sensor and assesses the integrity of the building are provided, and information indicating the assessment result is transmitted to a user terminal.

Also in the configuration disclosed in Patent Document 3, a storage battery is required for causing the sensor, a recording device that records response information from the sensor, and the like to operate at all times, which makes a size of the system configuration large.

SUMMARY

One or more embodiments of the present invention provide a building integrity assessment system that can be realized with a relatively simple configuration as a method for diagnosing and evaluating the integrity of a building at the time of outbreak of an earthquake.

For example, one or more embodiments of the present invention provide a method for diagnosing and evaluating the integrity of a building even from a remote place immediately after the outbreak of an earthquake, wherein a building integrity assessment system can be constructed with a relatively simple configuration to acquire earthquake information by activating sensors in a state in which earthquake information is received by installing a building bottom sensor at a bottom of a building to detect an earthquake taking place immediately below the building and installing an earthquake early-warning receiver to detect an earthquake taking place at a remote place, with no need to provide a large-size storage battery or a recording device. In one or more embodiments, the building integrity assessment system has sensors installed at each of stories and structural elements (pillars, beams, and walls) of a building and estimates building state information (natural frequency, inter-story drift angles, and inclination angle) from earthquake information while acquiring the earthquake information (acceleration, strain amount, and inclination) from a time before a major motion of the earthquake arrives at the building to a time after the arrival.

One or more embodiments employ the following means. The building integrity assessment system of one or more embodiments diagnoses and evaluates integrity of a building. The building integrity assessment system includes an earthquake detector including a building bottom sensor installed at a bottom of a building and configured to detect acceleration and an earthquake early-warning receiver configured to receive an earthquake early warning, a plurality of sensors provided at a plurality of positions in the building and configured to measure an influence of an earthquake on the building at each of the positions and to transmit measurement results to a cloud computer using a wireless communication function, and an integrity assessment part configured to estimate and evaluate integrity of the building based on the measurement results transmitted to the cloud computer. In a case where the building bottom sensor detects preliminary tremors or the earthquake early-warning receiver receives the earthquake early warning, the plurality of sensors are activated and measures the influence of the earthquake on the building from a time before a major motion arrives at the building to a time after the arrival.

According to one or more embodiments of the above-described configuration, since the plurality of sensors are activated when the outbreak of the earthquake is detected due to the detection of preliminary tremors by the building bottom sensor installed at the bottom of the building or the reception of the earthquake early warning, the major motion of the earthquake, that is, the influence of the earthquake on the building from a time before a seismic load (ground shaking) arrives at the building (before the outbreak of the earthquake) to a time after the arrival (after the outbreak of the earthquake) is measured. The measurement results of the measured influence of the earthquake are transmitted to the cloud computer and saved. The integrity assessment part estimates a structure performance index of the building based on the assessment results transmitted to the cloud computer.

According to one or more embodiments, since the plurality of sensors are activated and the influence of the earthquake on the building is measured when the outbreak of the earthquake is detected as described above, the plurality of sensors installed inside the building do not need to operate at all times. Therefore, a storage battery for causing the plurality of sensors and a storage device to operate is unnecessary. As a result, the building integrity assessment system that evaluates the integrity of a building at the time of the outbreak of an earthquake can be realized with a relatively simple configuration.

According to one or more embodiments of the building integrity assessment system, the plurality of sensors includes an accelerometer, a strain sensor, and an inclinometer.

According to one or more embodiments of this configuration, by providing the accelerometer, the strain sensor, and the inclinometer as the plurality of sensors at a plurality of positions in the building, the influence of earthquakes on each position in the building can be measured for every part inside the building more accurately.

According to one or more embodiments, the building integrity assessment system further includes a display provided in an inside of the building or at a remote place (alternatively, the system may include a display at each of an inside of the building and a remote place). The plurality of sensors are provided at each story of the building or each structural element constituting the building. The integrity assessment part is configured to compute an amount of displacement and an inter-story drift angle from the measurement results, to compare the computed values to a predetermined threshold, and then to compute a structure performance index indicating the integrity of the building for each story of the building and each structural element of the building. The display is configured to display assessment information of the building based on the computed structure performance index.

According to one or more embodiments of this configuration, the influence of the earthquake on the building can be measured by the sensors, and the structure performance index can be computed based on the measurement results, and thus it is possible to accurately ascertain whether the integrity of the building has changed at the time of the outbreak of the earthquake for each part inside the building.

According to one or more embodiments, a building integrity assessment system that can be realized with a relatively simple configuration can be provided for a method for diagnosing and evaluating the integrity of a building at the time of outbreak of an earthquake.

DETAILED DESCRIPTION OF THE INVENTION

The present invention generally relates to a building integrity assessment system for diagnosing and evaluating the integrity of a building from a remote place immediately after outbreak of earthquakes. In one or more embodiments, a building bottom sensor for earthquakes is installed/disposed immediately below the building, an earthquake early-warning receiver for detection of earthquakes taking place at a remote place is installed, and a wind detector for detecting strong winds is installed. In addition, by activating a sensor in a state in which earthquake information or strong wind information is received, while earthquake information from a time before arrival of a major motion to a time after the arrival of the major motion of earthquakes (accelerations, strain amounts, and inclinations) at the building is acquired for each of stories and structural elements (pillars, beams, and walls) of the building, building state information (a natural frequency, an inter-story drift angle, and an inclination angle) is estimated from the earthquake information, and then the integrity of the building is diagnosed and evaluated.

Embodiments for implementing a building integrity assessment system will be described below with reference to and based on the accompanying drawings.

Figure 1:
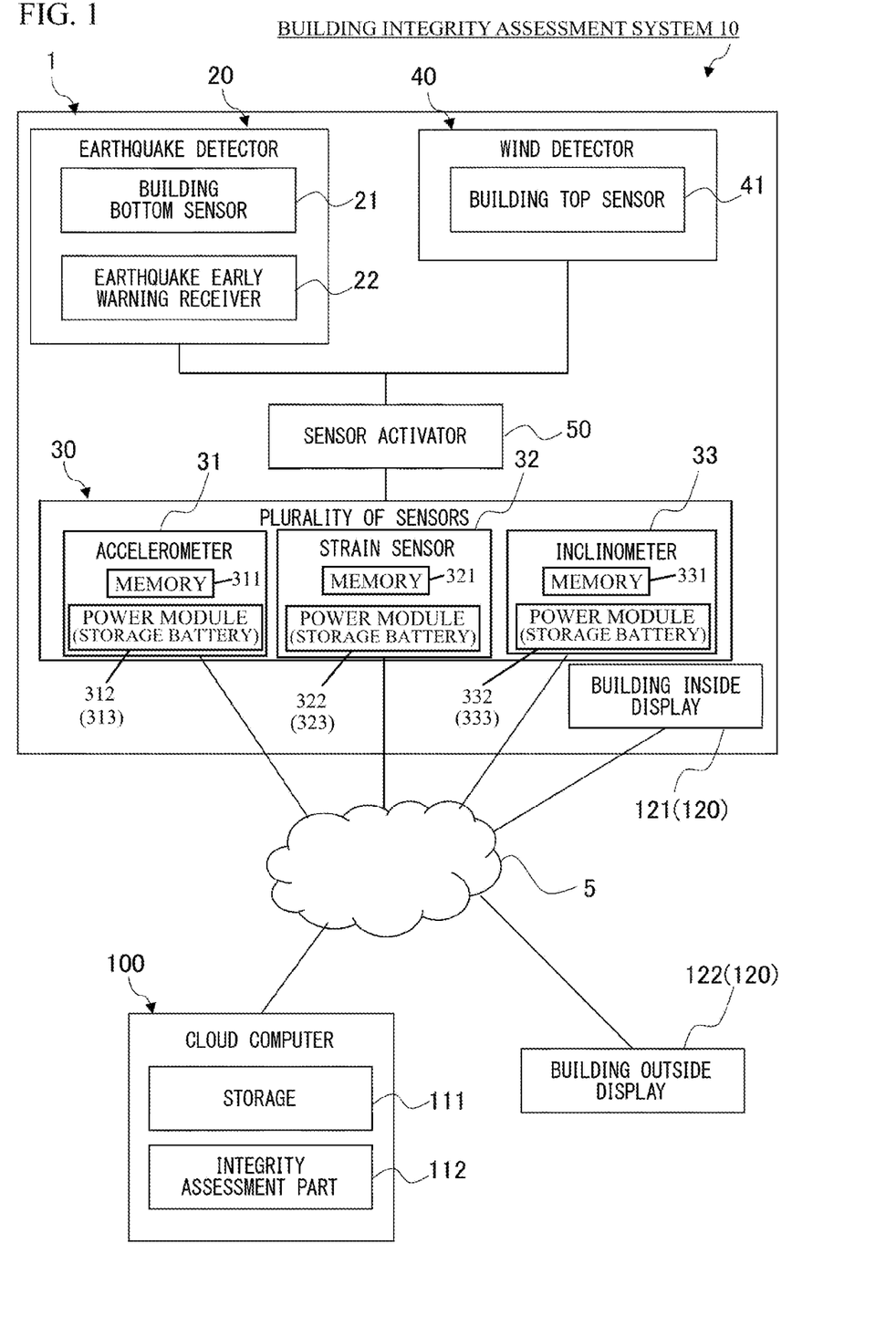
FIG. 1 is a block diagram showing a functional configuration of a building integrity assessment system according to one or more embodiments.
Figure 2:
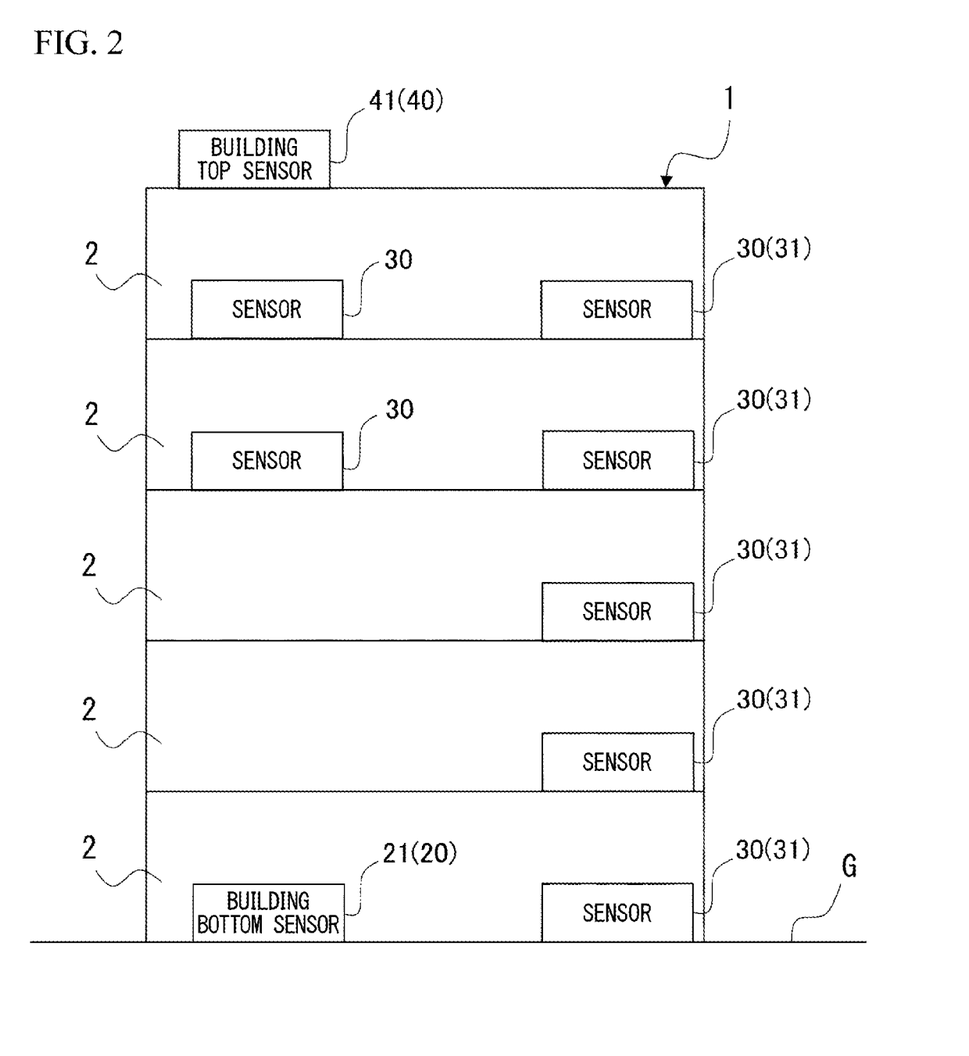
FIG. 2 is a sectional view showing an example of a building that is an integrity assessment target of the building integrity assessment system according to one or more embodiments.
Figure 3:
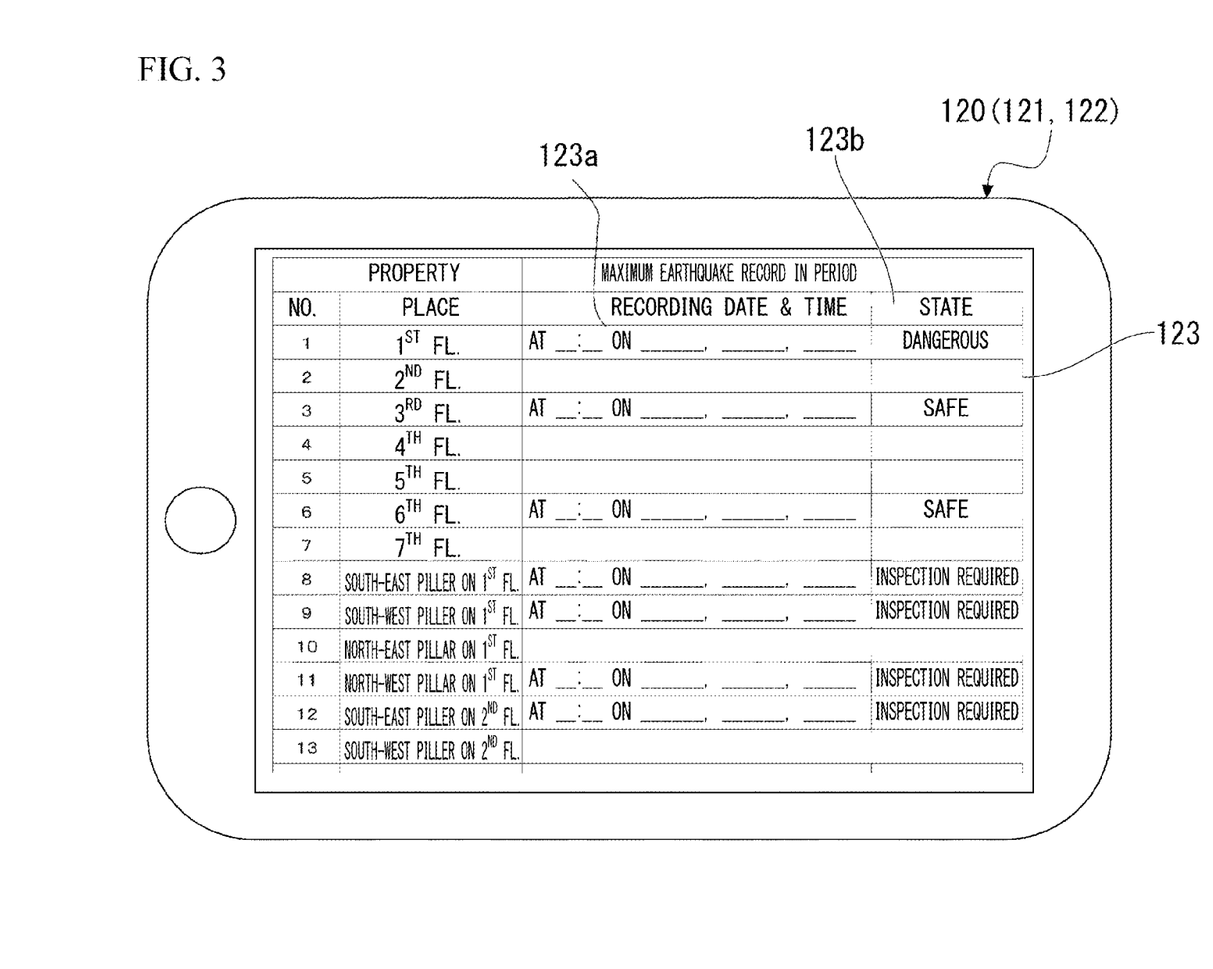
FIG. 3 is a diagram showing an example of assessment information displayed on a display of the building integrity assessment system according to one or more embodiments.

FIG. 1 is a block diagram showing a functional configuration of a building integrity assessment system according to one or more embodiments. FIG. 2 is a sectional view showing an example of a building that is an integrity assessment target of the building integrity assessment system according to one or more embodiments. FIG. 3 is a diagram showing an example of a list of assessment information displayed on a display of the building integrity assessment system according to one or more embodiments.

The building integrity assessment system 10 includes an earthquake detector 20, a plurality of sensors 30, a wind detector 40, a cloud computer 100, and a display 120 as shown in FIG. 1. The building integrity assessment system 10 diagnoses and evaluates the integrity of a building 1.

A building 1 that is an integrity assessment target of the building integrity assessment system 10 is constructed on a ground G and has a plurality of stories 2 vertically as shown in FIG. 2. Here, the building 1 is not limited at all in terms of the number of stories and structure (a reinforced concrete structure, a steel frame structure, and the like).

The earthquake detector 20, the plurality of sensors 30, the wind detector 40, and a sensor activator 50 are provided in the building 1 as shown in FIGS. 1 and 2.

The earthquake detector 20 includes a building bottom sensor 21 and an earthquake early-warning receiver 22 as shown in FIG. 1.

The building bottom sensor 21 is installed at a bottom of the building 1, for example, the lowermost story of the building 1. The building bottom sensor 21 detects an acceleration that occurs at the bottom of the building 1 quaking along with the ground G at the time of an outbreak of an earthquake. The building bottom sensor 21 detects preliminary tremors (P wave) at the time of outbreak of an earthquake. When preliminary tremors are detected, the building bottom sensor 21 gives a notification of a predetermined signal to the sensor activator 50.

The earthquake early-warning receiver 22 receives an earthquake early warning issued from the Japan meteorological agency when an earthquake takes place via an external communication means such as a telephone, a communication network, the Internet, or television or radio broadcasting. The earthquake early warning is issued in a case where an earthquake takes place not only at the location of the building 1 but also at a remote place away from the location of the building 1. Upon receiving the earthquake early warning, the earthquake early-warning receiver 22 gives a notification of a predetermined signal to the sensor activator 50.

The wind detector 40 includes a building top sensor 41. The building top sensor 41 is installed at a top of the building 1, for example, the rooftop or the top story of the building 1. The building top sensor 41 detects an acceleration generated when the top of the building 1 shakes due to strong winds or the like. In addition, the building top sensor 41 may be an anemometer. The building top sensor 41 gives a notification of a detection value of a detected wind force (wind speed) to the sensor activator 50.

The sensor activator 50 activates the plurality of sensors 30. The sensor activator 50 activates the plurality of sensors 30 when a notification of a predetermined signal is received from the building bottom sensor 21 or the earthquake early-warning receiver 22. That is, the plurality of sensors 30 are activated when the building bottom sensor 21 detects preliminary tremors (P wave) when an earthquake takes place or when the earthquake early-warning receiver 22 receives an earthquake early warning. Accordingly, the sensor activator 50 activates the plurality of sensors 30 before an earthquake of which a major motion is likely to arrive at the location of the building 1 takes place.

In addition, the sensor activator 50 activates the plurality of sensors 30 when a detection value of a wind force notified by the building top sensor 41 of the wind detector 40 is equal to or higher than a predetermined reference value.

The plurality of sensors 30 are provided at a plurality of positions within the building 1. In one or more embodiments, accelerometers 31, strain sensors 32, and inclinometers 33 are provided as the plurality of sensors 30.

The accelerometers 31 are provided at, for example, a plurality of stories 2 of the building 1. The accelerometers 31 detect an acceleration generated at each of the stories 2 as an influence of earthquakes on the building 1.

The strain sensors 32 detect a strain generated in structural elements such as pillars, beams, pillar-beam joints, walls, and floor slabs constituting the frame of the building 1 as an influence of earthquakes on the building 1.

The inclinometers 33 are provided on structural elements such as pillars, walls, and the like. The inclinometers 33 detect inclinations of the structural elements caused by earthquakes as an influence of earthquakes on the building 1.

In one or more embodiments, silicon single crystal resonant sensors manufactured using, for example, a micro electro mechanical systems (MEMS) technology may be used for the accelerometers 31, the strain sensors 32, and the inclinometers 33 constituting the plurality of sensors 30. The silicon single crystal resonant sensors are silicon resonant sensors driven by voltages, unlike general silicon resonant sensors driven by currents. Silicon single crystal resonant sensors have excellent long-term stability in operations and low power consumption.

In a case where silicon single crystal resonant sensors are used for the accelerometer 31, silicon resonators of the silicon single crystal resonant sensors are provided at the base of a cantilevered weight. When an acceleration caused by an earthquake is applied to a tip of the silicon resonator of a silicon single crystal resonant sensor, a strain occurs on a surface of the silicon resonator, and a resonance frequency thereof changes. The silicon single crystal resonant sensor detects a change in an applied strain occurring in the silicon resonator constituting the silicon single crystal resonant sensor caused by an acceleration from an earthquake as a change in the resonance frequency of the silicon resonator. Such accelerometers 31 have sensor characteristics including, for example, a detection sensitivity of $\frac{1}{1000}$ gal (Gal), a measurement range of ±2G, and a temperature range of −10 to 50° C.

In a case where silicon single crystal resonant sensors are used for the strain sensor 32, if a strain occurs, a resonance frequency of the sensors changes. By detecting resonance frequencies of the silicon resonators, the silicon single crystal resonant sensors detect an amount of strain (displacement) occurring in the structural elements due to earthquakes. Such strain sensors 32 have sensor characteristics including, for example, a measurement sensitivity of ±1με, a measurement range of ±2000με, and a temperature range of −10 to 50° C.

In a case where silicon single crystal resonant sensors are used for the inclinometers 33, silicon resonators constituting the silicon single crystal resonant sensors are provided at the base of a cantilevered weight. When an acceleration is applied to a tip of the silicon resonator a silicon single crystal resonant sensor due to an inclination of the structural elements, a strain occurs on the silicon resonator, and a resonance frequency thereof changes. The silicon single crystal resonant sensors detect displacement caused by an inclination of the structural elements based on a change in a DC component of seismic occurring in the structural elements due to earthquakes. Such inclinometers 33 have sensor characteristics including, for example, an inclination resolution of 0.01°.

By using silicon single crystal resonant sensors for the accelerometers 31, the strain sensors 32, and the inclinometer 33 as described above, sensor detection sensitivity can be much higher than that of commercially available sensors, and a change such as slight deformation and minute vibration occurring in the building 1 can be detected.

The accelerometers 31, the strain sensors 32, and the inclinometers 33 included in the plurality of sensors 30 have a memory 311, a memory 321, and a memory 331, respectively, which store detection values for a predetermined time, for example, three minutes. This memory 311, 321, or 331 is a non-volatile memory and power does not need to be supplied thereto at all times. When the plurality of sensors 30 are activated by the sensor activator 50, each of the plurality of sensors 30 causes detection values for the predetermined time to be stored in the memory 311, 321, or 331 as measurement results at predetermined measurement time intervals after the activation.

Therefore, the sensor activator 50 activates the plurality of sensors 30 in response to detection of preliminary tremors detected by the building bottom sensor 21 or reception of an earthquake early warning by the earthquake early-warning receiver 22, the plurality of sensors 30 (the accelerometers 31, the strain sensors 32, and the inclinometers 33) perform detection for a predetermined time, and an influence of earthquakes on the building 1 imparted from a time before a major motion arrives at the building 1 to after the arrival is measured.

Each of the accelerometers 31, the strain sensors 32, and the inclinometers 33 constituting the plurality of sensors 30 may include not only a wired communication module but also a wireless communication module (not shown). The wireless communication module has, for example, a wireless communication function in a 920 MHz band, and transmits a detection signal including measurement results stored in memories of the accelerometers 31, the strain sensors 32, and the inclinometers 33 to the cloud computer 100, which will be described below, via a network 5 such as a wireless local area network (LAN) or a wireless telephone communication network. Accordingly, the plurality of sensors 30 can be easily installed without an effort for wiring work for wires to each of the plurality of sensors 30.

In addition, the accelerometers 31, the strain sensors 32, and the inclinometers 33 operate by receiving power supply from autonomous power modules 312, 322, and 323, respectively, using a solar cell. The accelerometers 31, the strain sensors 32, and the inclinometers 33 may each include autonomous power modules 312, 322, and 323, respectively, and one autonomous power module may supply power to a plurality of accelerometers 31, strain sensors 32, and inclinometers 33. The autonomous power module continues supplying power to each of the accelerometers 31, the strain sensors 32, and the inclinometers 33 even in a case where the plurality of sensors 30 are activated and then the sensor activator 50 is damaged and stops operation due to earthquakes. The autonomous power modules 312, 322, and 332 have a capability of generating power such that each of the accelerometers 31, the strain sensors 32, and the inclinometers 33 can continue detection for a predetermined period of time when the sensors are activated by the sensor activator 50.

In addition, instead of the autonomous power modules 312, 322, and 332, built-in storage batteries 313, 323, and 333 may be provided in the accelerometers 31, the strain sensors 32, and the inclinometers 33, respectively, and the built-in storage batteries 313, 323, and 333 may be charged with a wireless power supply device. Since the built-in storage batteries 313, 323, and 333 in this case only needs to last for a short period of time in which the plurality of sensors 30 are activated by the sensor activator 50 and measurement is performed, an increase in size of the system configuration can be avoided.

Each of the accelerometers 31, the strain sensors 32, and the inclinometers 33 may have a global positioning system (GPS) mounted therein and gives time information (time stamps) to detection signals when the detection signals are transmitted to the cloud computer 100.

The accelerometers 31, the strain sensors 32, and the inclinometers 33 are activated at predetermined time intervals based on time information of the GPS and measure accelerations, strains of the structural elements, and inclinations of the structural elements for a short period of time (e.g., 10 seconds). In this case, due to the GPS mounted in each of the plurality of sensors 30, activation times of the plurality of sensors 30 can be accurately set.

In addition, when the plurality of sensors 30 are activated at predetermined time intervals as described above, whether all of the plurality of sensors 30 (the accelerometers 31, the strain sensors 32, and the inclinometers 33) are operating normally is also checked.

The cloud computer 100 is a computer device provided to be capable of receiving detection signals from the plurality of sensors 30 of the building 1 via the network 5. The cloud computer 100 includes a storage 111 and an integrity assessment part 112 as function parts.

The storage 111 includes various kinds of storage device and the like including a hard disk drive (HDD), a solid-state drive (SSD), a memory, and the like. The storage 111 stores detection values of accelerations, strains, inclinations, and the like included in detection signals received from the accelerometers 31, the strain sensors 32, and the inclinometers 33 constituting the plurality of sensors 30 in association with time information regarding detection of each of the detection values.

The integrity assessment part 112 estimates and evaluates the integrity of the building 1 based on measurement results (detection values and time information) from the plurality of sensors 30 stored in the storage 111.

When the accelerometers 31, the strain sensors 32, and the inclinometers 33 constituting the plurality of sensors 30 are activated at predetermined time intervals and perform measurement for a short period of time (e.g., 10 seconds), the integrity assessment part 112 computes a natural frequency of the building 1 from a detection value of acceleration detected by the accelerometers 31 using, for example, a Fast Fourier Transform (FFT) or a subspace method. By observing a change in the natural frequency of the building 1 for a long period of time, the integrity assessment part 112 can monitor long-term change of the building 1 over years.

In addition, the integrity assessment part 112 computes building state information indicating a state of each part of the building 1 (every story 2 and every structural element) as will be described below in a case where activation of the plurality of sensors 30 by the sensor activator 50 is triggered by detection of preliminary tremors (P wave) by the building bottom sensor 21 at the time of outbreak of an earthquake or reception of an earthquake early warning of the earthquake early-warning receiver 22. As will be described below in detail, examples of the building state information include the natural frequency of the building 1, an inter-story drift angle of the building 1, an inclination angle of a structural element, and the like.

Furthermore, the integrity assessment part 112 generates a structure performance index indicating integrity of each part of the building 1 based on the computed building state information regarding each part of the building 1. The structure performance index includes, for example, evaluation of a plurality of grades such as "safe," "inspection required," and "dangerous."

The display 120 includes a building inside display 121 provided inside the building 1 and a building outside display 122 provided at a remote place. The building inside display 121 is installed in, for example, a management center of the building 1. The building outside display 122 is provided in a terminal, for example, a personal computer, a tablet device, a smartphone, a mobile telephone, or the like possessed by a manager of the building 1. The building outside display 122 may be provided in the cloud computer 100. Each of the building inside display 121 and the building outside display 122 can communicate with the cloud computer 100 via a network 5. Further, the display 120 may include at least one of the building inside display 121 and the building outside display 122.

FIG. 3 shows an example of assessment information displayed on a display of the building integrity assessment system according to one or more embodiments.

The display 120 displays a list 123 as assessment information generated based on structure performance indexes of each part of the building 1 as shown in FIG. 3. The list 123 includes, for example, a recorded date/time information 123a regarding an earthquake of each part of the building 1 owned or managed by a user, a structure performance index 123b of each part of the building 1 generated by the integrity assessment part 112, and the like.

Further, the list 123 shown in FIG. 3 mentioned here is merely an example, and the information included in the list 123 can be appropriately changed.

Next, details of integrity assessment of the building 1 by the above-described building integrity assessment system 10 will be described.

Figure 4:
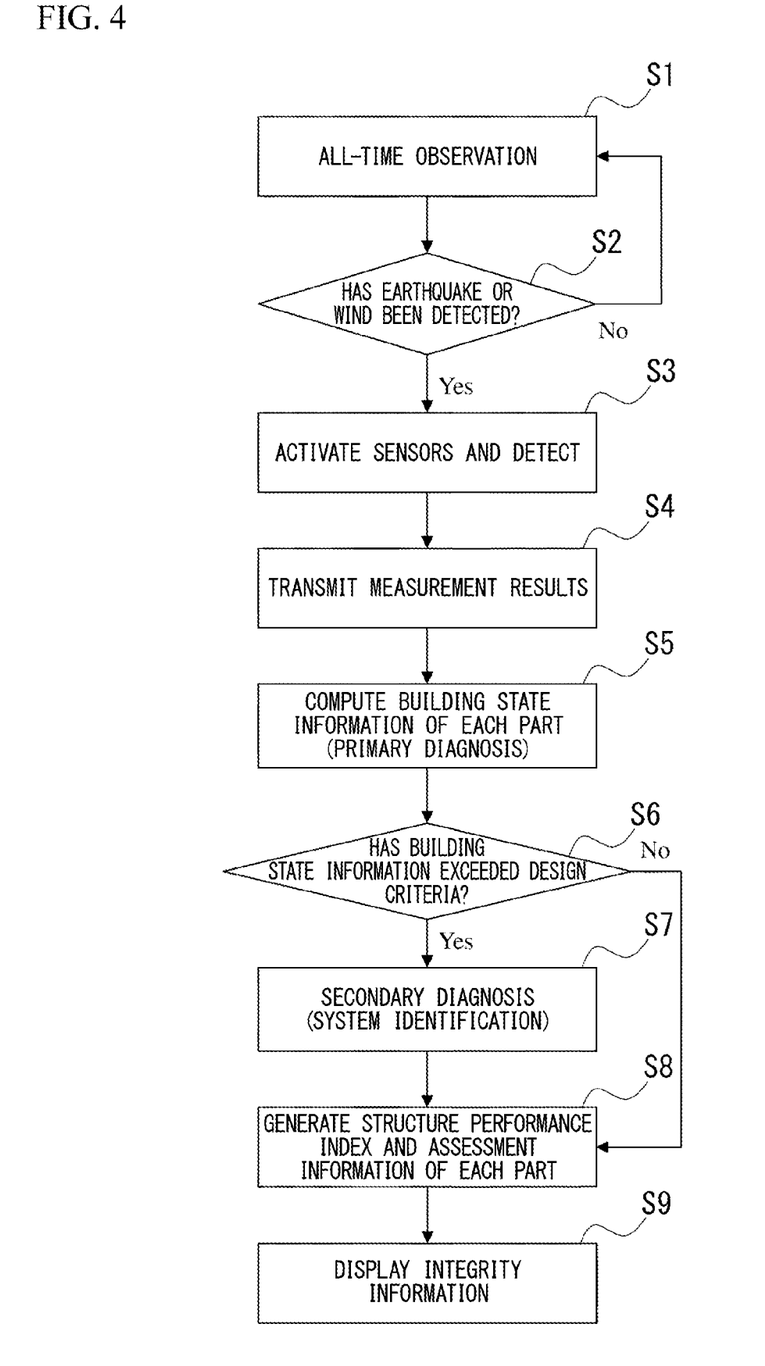
FIG. 4 is a diagram showing the flow of integrity assessment of a building by the building integrity assessment system according to one or more embodiments.

FIG. 4 shows the flow of integrity assessment of a building performed by the building integrity assessment system according to one or more embodiments. The building integrity assessment system 10 is configured to perform an all-time observation process (steps S1 and S2), a primary diagnosis process (steps S3 to S6), a secondary diagnosis process (step S7), and a process of generating and displaying a structure performance index and assessment information indicating integrity of the building (steps S8 and S9) as shown in FIG. 4.

In particular, the building integrity assessment system 10 performs observation at all times even when no earthquakes take place (step S1). At this time, the accelerometers 31, the strain sensors 32, and the inclinometers 33 constituting the plurality of sensors 30 are activated at predetermined time intervals and perform measurement for a short period of time (e.g., 10 seconds). Long-term change of the building 1 is monitored over years by observing change in the natural frequency of the building 1 computed from detection values of accelerations detected by the accelerometers 31.

In addition, when the plurality of sensors 30 are activated at predetermined time intervals, whether all of the plurality of sensors 30 (the accelerometers 31, the strain sensors 32, and the inclinometers 33) are operating normally is also checked.

The sensor activator 50 detects the presence of an earthquake or wind of a level higher than or equal to a predetermined reference level at predetermined very short times (step S2). If no earthquake or wind at a level higher than or equal to a predetermined reference level is detected, the process returns to step S1 and the all-time observation process is repeated at predetermined time intervals.

When a notification of a predetermined signal is received from the building bottom sensor 21, when a notification of a predetermined signal is received from the earthquake early-warning receiver 22, or when a wind force detection value notified from the building top sensor 41 is higher than or equal to a predetermined threshold, the sensor activator 50 activates the plurality of sensors 30 to cause each of the sensors 30 to perform measurement (step S3).

Each of the accelerometers 31, the strain sensors 32, and the inclinometers 33 constituting the plurality of sensors 30 performs detection for a predetermined period of time, for example, for three minutes and causes the detection value to be stored in a memory 311, 321, or 331 at predetermined measurement time intervals.

The accelerometers 31, the strain sensors 32, and the inclinometers 33 transmit detection signals including the measurement results stored in the memory 311, 321, or 331 to the cloud computer 100 using the wireless communication module (not shown) after the detection for the predetermined period of time (step S4).

Figure 5:
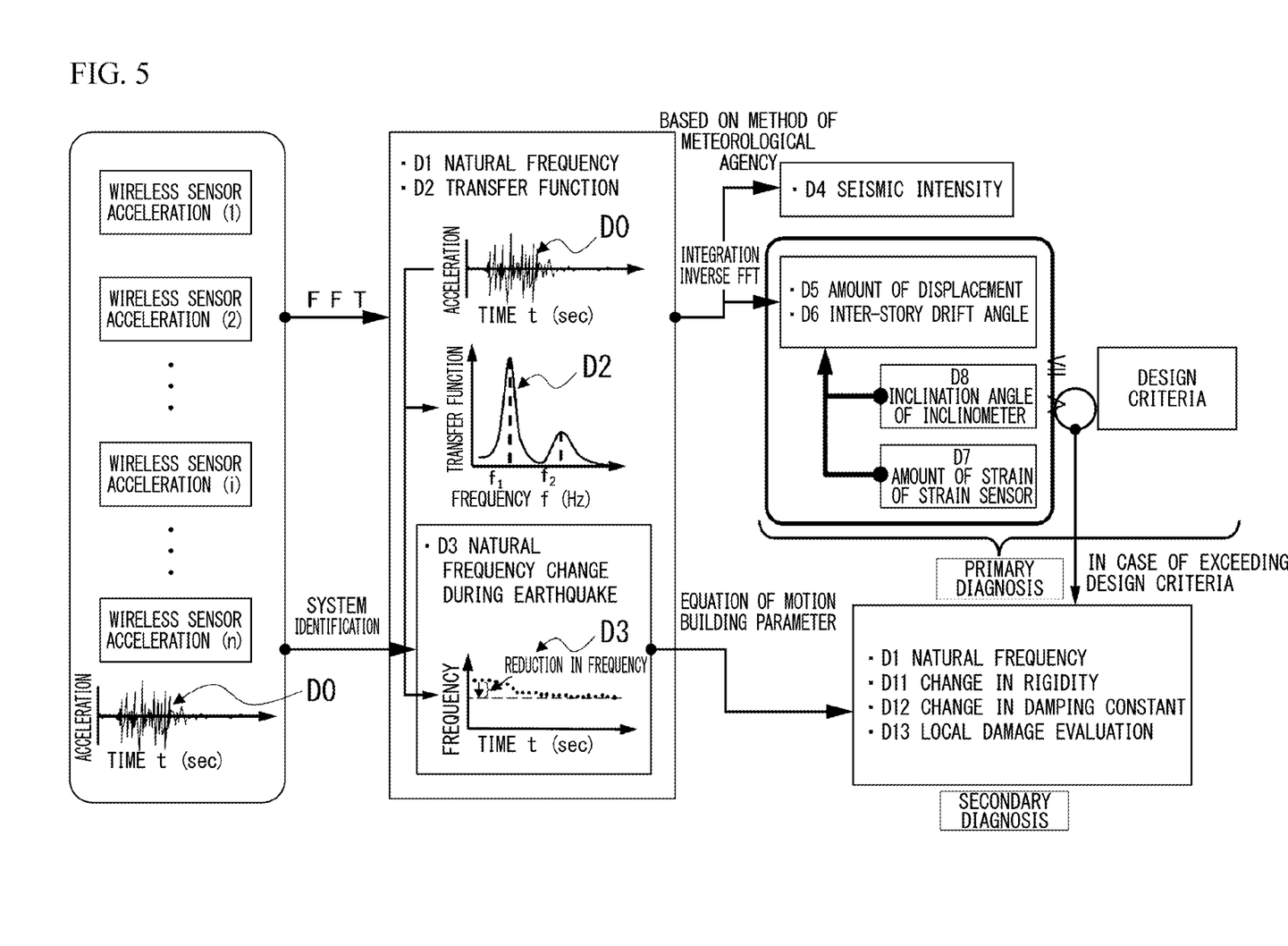
FIG. 5 is a diagram schematically showing the flow of a process for evaluating integrity of a building by an integrity assessment part of the building integrity assessment system according to one or more embodiments.

FIG. 5 is a diagram schematically showing the flow of a process for evaluating integrity of a building by the integrity assessment part of the building integrity assessment system according to one or more embodiments.

The integrity assessment part 112 of the cloud computer 100 computes building state information indicating a state of each part of the building 1 as primary diagnosis based on measurement results (detection values and time information) transmitted from the plurality of sensors 30 and stored in the storage 111 (step S5).

As the primary diagnosis, the building state information computed by the integrity assessment part 112 includes a natural frequency D1 of the building 1, a transfer function D2, a natural frequency change during an earthquake D3, a seismic intensity D4 at the location of the building 1, an amount of displacement D5 at each story 2 of the building 1, an inter-story drift angle D6, an amount of strain D7 of structural elements of the building 1, an inclination angle D8, and the like as shown in FIG. 5.

The natural frequency D1 of the building 1 and the transfer function D2 are computed using an FFT based on detection values of an acceleration D0 detected by the accelerometers 31. Furthermore, the natural frequency change during the earthquake D3 of the building 1 is obtained from waveform data of the detection values of the acceleration D0 for a predetermined period of time stored in the memory 311 of the accelerometers 31.

The seismic intensity D4 at the location of the building 1 is computed based on the detection values of the acceleration detected by the accelerometers 31 using a method prescribed by the Japan meteorological agency.

In addition, the amount of displacement D5 at each story 2 of the building 1 and the inter-story drift angle D6 are obtained from an inverse FFT process by integrating the waveform data (response acceleration waveform) of the detection values of the acceleration D0 detected by the accelerometers 31 using a known calculation method.

The amount of strain D7 of structural elements of the building 1 is obtained from detection values from the strain sensors 32.

The inclination angle D8 of the structural elements of the building 1 is obtained from detection values from the inclinometers 33.

The integrity assessment part 112 determines whether each piece of the building state information has exceeded predetermined design criteria (thresholds) in each of the stories 2 of the building 1 at which the accelerometers 31 are provided and each of the structural elements (pillars, beams, walls, etc.) of the building 1 at which the strain sensors 32 and the inclinometers 33 are provided based on the building state information obtained as described above (step S6). At this time, since the plurality of sensors 30 perform the measurement for the predetermined period of time, detection values of when the building state information has the maximum (worst) value during the predetermined period of time are used for the building state information of each part of the building.

In a case where at least one piece of the building state information computed for each of the stories 2 and each of the structural elements of the building 1 exceeds the predetermined design criteria (thresholds), the integrity assessment part 112 performs secondary diagnosis (step S7). In the secondary diagnosis, the integrity assessment part 112 computes a change in rigidity D11, a change in a damping constant D12, and a natural period of the building 1 as building state information to be used in the secondary diagnosis, in addition to the building state information computed in the primary diagnosis. The change in rigidity D11 and the change in the damping constant D12 of the building 1 are estimated from a rigidity-changing point of each story or each structural element of the building using a system identification method (e.g., "System Identification" written by Kiyoshi Wada and three more, Corona Publishing Co. Ltd., Mar. 21, 2017) for applying parameters of the building 1 to an equation of motion in a relation between an initial model (initial data) of the building and waveform data (output data) of time-series earthquake information. Furthermore, the integrity assessment part 112 estimates a damaged location based on the computed change in rigidity D11 and change in the damping constant D12 of the building 1 and obtains local damage evaluation D13.

The integrity assessment part 112 generates structure performance indexes and assessment information indicating the integrity of the building 1 based on the building state information obtained in the primary and secondary diagnosis (step S8).

If the computed entire building state information of each part of the building has not exceeded the predetermined design criteria in step S6, the integrity assessment part 112 generates structure performance indexes indicating "safe" for each of the stories 2 of the building 1 and each of the structural elements of the building 1 in which the strain sensors 32 and the inclinometers 33 are provided based on the building state information obtained in the primary diagnosis.

In addition, if at least one piece of the computed building state information of each part of the building has exceeded the predetermined design criteria in step S6, the integrity assessment part 112 generates structure performance indexes indicating "inspection required" or "dangerous" for the part of the building 1 (a specific story 2 or a specific structural element) corresponding to the building state information exceeding the design criteria according to the degree of excess. The integrity assessment part 112 generates structure performance indexes indicating "safe" for the stories 2 and structural elements other than the part of the building 1 corresponding to the building state information exceeding the design criteria.

Furthermore, the integrity assessment part 112 generates data of the list 123 of the assessment information as shown in FIG. 3 using the structure performance indexes generated for each part of the building 1.

The integrity assessment part 112 transmits the generated assessment information to the display 120.

The display 120 displays the list 123 of the assessment information transmitted from the integrity assessment part 112 of the cloud computer 100 (step S9).

The user can check the assessment results on the integrity of each part of the building 1 based on the displayed list 123 of the assessment information as shown in FIG. 3 even at a place away from the building 1.

The building integrity assessment system 10 described above has the earthquake detector 20 including the building bottom sensor 21 which is installed at a bottom of the building 1 and detects acceleration and the earthquake early-warning receiver 22 which receives earthquake early warnings, the plurality of sensors 30 which are provided at a plurality of positions of the building 1, measure an influence of earthquakes on the building 1 at each of the positions, and transmit measurement results to the cloud computer 100 using the wireless communication function, and the integrity assessment part 112 which estimates and assesses the integrity of the building 1 based on the measurement results transmitted to the cloud computer 100, the plurality of sensors 30 are activated when the building bottom sensor 21 detects preliminary tremors or the earthquake early-warning receiver 22 receives an earthquake early warning, and the plurality of sensors 30 measure an influence of earthquakes on the building 1 from a time before a major motion arrives at the building 1 to a time after the arrival.

With this configuration, since the plurality of sensors 30 are activated when the outbreak of the earthquake is detected due to the detection of the preliminary tremors by the building bottom sensor 21 installed at the bottom of the building 1 or the reception of the earthquake early warning, the major motion of the earthquake, that is, the influence of the earthquake on the building 1 from a time before a seismic load (ground shaking) arrives at the building (before the outbreak of the earthquake) to a time after the arrival (after the outbreak of the earthquake) can be measured. Since the plurality of sensors 30 are activated and the influence of the earthquake on the building 1 is measured when the outbreak of the earthquake is detected, the plurality of sensors 30 installed inside the building 1 do not need to operate at all times. Therefore, storage batteries 313, 323, and 333 for causing the plurality of sensors 30, a storage device storing information measured by the plurality of sensors 30, and the like to operate at all times is unnecessary. As a result, the building integrity assessment system 10 for assessing integrity of the building 1 at the time of the outbreak of an earthquake can be realized with a relatively simple configuration.

Particularly, in one or more embodiments, the earthquake detector 20 is configured to activate the plurality of sensors 30 before a major motion arrives using the building bottom sensor 21 and the earthquake early-warning receiver 22 together.

When an earthquake has taken place near the building 1, the interval from preliminary tremors and a major motion is short, and thus the plurality of sensors 30 are not likely to be activated before the major motion arrives if reception of an earthquake early warning is waited for. In such a case, the earthquake detector 20 activates the plurality of sensors 30 based on detection of preliminary tremors by the building bottom sensor 21.

In addition, when an earthquake takes place at a place away from the building 1, preliminary tremors becomes weak when it arrives near the building 1, and therefore the building bottom sensor 21 is not likely to detect the tremor effectively even using a silicon single crystal resonant sensor. In such a case, the earthquake detector 20 activates the plurality of sensors 30 based on reception of an earthquake early warning by the earthquake early-warning receiver 22. When an earthquake takes place at a remote place, the interval from preliminary tremors to a major motion is long, and thus the plurality of sensors 30 can be activated before the major motion arrives.

As described above, no matter how far away an earthquake takes place, the plurality of sensors 30 can be reliably activated using the building bottom sensor 21 and the earthquake early-warning receiver 22 together.

In addition, the plurality of sensors 30 include the accelerometers 31, the strain sensors 32, and the inclinometers 33.

With this configuration, the occurrence of local damage to the structural elements of the building 1 can be measured with higher accuracy by having the strain sensors 32 and the inclinometers 33 in addition to the accelerometers 31. Therefore, the influence of the earthquake on the building 1 at each position in the building 1 can be measured more accurately.

In addition, the building integrity assessment system 10 includes the display 120 in the inside of the building 1 or at a remote place (alternatively, the system 10 may include one display 120 inside the building and another display 120 at a remote place), the plurality of sensors 30 are provided at each of the stories 2 of the building 1 and each of the structural elements constituting the building 1, the integrity assessment part 112 computes an amount of displacement and an inter-story drift angle from the measurement results, compares the computed values to predetermined thresholds, and then computes structure performance indexes indicating integrity of the building for each of the stories 2 of the building 1 and each of the structural elements of the building 1, and the display 120 displays the list 123 of assessment information of the building based on the computed structure performance indexes.

With this configuration, the plurality of sensors 30 can measure the influence of earthquakes on the building 1 and compute the structure performance index based on the measurement results, and therefore, it is possible to accurately ascertain whether the integrity of the building 1 has changed at the time of the outbreak of the earthquakes for each part inside the building 1 based on the list 123 of the assessment information.

In addition, the earthquake detector 20, the plurality of sensors 30, the wind detector 40, and the sensor activator 50 described above can also be retrofitted in the existing building 1.

Furthermore, since each of the plurality of sensors 30 has a memory 311, 321, or 331, even in a case where the building integrity assessment system 10 seems to have trouble in operations due to a failure of the cloud computer 100 or the like, measurement results of the sensors 30 can also be acquired directly from the sensors 30.

In addition, even when there are no earthquakes, the building integrity assessment system 10 activates the plurality of sensors 30 at predetermined time intervals to cause the sensors to perform measurement, thus a long-term change over years of the building 1 can be monitored, and maintenance for the building 1 and the like can be performed at an appropriate timing.

While embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A building integrity assessment system that diagnoses and evaluates integrity of a building, the integrity assessment system comprising:
    an earthquake detector comprising:
        a building bottom sensor disposed at a bottom of the building and that detects acceleration; and
        an earthquake early-warning receiver that receives an earthquake early warning;
    a cloud computer; and
    a plurality of sensors disposed at a plurality of positions in the building, wherein
    the plurality of sensors measures an influence of an earthquake on the building at each of the positions and wirelessly transmits measurement results to the cloud computer,
    the cloud computer estimates and evaluates the integrity of the building based on the measurement results, and
    in response to the building bottom sensor detecting preliminary tremors or the earthquake early-warning receiver receiving the earthquake early warning, the plurality of sensors is activated and measures the influence of the earthquake on the building from a time before a major motion arrives at the building to a time after the arrival,
    the building integrity assessment system further comprises a display disposed inside of the building or in a remote place, wherein
    the plurality of sensors is disposed at each story of the building or each structural element constituting the building,
    the cloud computer computes an amount of displacement and an inter-story drift angle from the measurement results, compares the computed values to a predetermined threshold, and then computes, based on the computed amount of displacement and inter-story drift angle, a structure performance index indicating the integrity of the building for each story of the building or each structural element of the building, and
    the display displays assessment information of the building based on the computed structure performance index.

2. The building integrity assessment system according to claim 1, wherein the plurality of sensors comprises an accelerometer, a strain sensor, and an inclinometer.

3. The building integrity assessment system according to claim 2, wherein each of the accelerometer, the strain sensor, and the inclinometer receives power supply from an autonomous power module.

4. The building integrity assessment system according to claim 2, wherein each of the accelerometer, the strain sensor, and the inclinometer comprises a storage battery.

5. The building integrity assessment system according to claim 2, wherein the cloud computer computes a natural frequency of the building from acceleration detected by the accelerometer using a Fast Fourier Transform or a subspace method and observes a change in the natural frequency.

6. The building integrity assessment system according to claim 1, wherein each of the plurality of sensors causes detection values for a predetermined time to be stored in a memory as measurement results at predetermined measurement time intervals after activation.

7. A building integrity assessment system that diagnoses and evaluates integrity of a building, the integrity assessment system comprising:
    an earthquake detector comprising:
        a building bottom sensor disposed at a bottom of the building and that detects acceleration; and
        an earthquake early-warning receiver that receives an earthquake early warning;
    a cloud computer; and
    a plurality of sensors disposed at a plurality of positions in the building, wherein
    the plurality of sensors measures an influence of an earthquake on the building at each of the positions and wirelessly transmits measurement results to the cloud computer,
    the cloud computer estimates and evaluates the integrity of the building based on the measurement results, and in response to the building bottom sensor detecting preliminary tremors or the earthquake early-warning receiver receiving the earthquake early warning, the plurality of sensors is activated and measures the influence of the earthquake on the building from a time before a major motion arrives at the building to a time after the arrival, the building integrity assessment system further comprises a building top sensor disposed at a top of the building and that detects wind force, wherein the plurality of sensors is activated in response to the building top sensor detecting that the wind force is higher than or equal to a predetermined threshold.

8. A building integrity assessment system that diagnoses and evaluates integrity of a building, the integrity assessment system comprising:

an earthquake detector comprising:

a building bottom sensor disposed at a bottom of the building and that detects acceleration; and an earthquake early-warning receiver that receives an earthquake early warning;

a cloud computer; and a plurality of sensors disposed at a plurality of positions in the building, wherein the plurality of sensors measures an influence of an earthquake on the building at each of the positions and wirelessly transmits measurement results to the cloud computer, the cloud computer estimates and evaluates the integrity of the building based on the measurement results, and in response to the building bottom sensor detecting preliminary tremors or the earthquake early-warning receiver receiving the earthquake early warning, the plurality of sensors is activated and measures the influence of the earthquake on the building from a time before a major motion arrives at the building to a time after the arrival, wherein the cloud computer:

computes building state information indicating a state of each part of the building as primary diagnosis based on measurement results of the plurality of sensors, compares the building state information for each story of and for each structural element of the building to a predetermined threshold, and performs secondary diagnosis in response to determining that at least one piece of the building state information for each story of and for each structural element of the building exceeds the predetermined threshold.

* * * * *